(12) United States Patent
Mowry

(10) Patent No.: US 11,036,787 B2
(45) Date of Patent: Jun. 15, 2021

(54) SYSTEM AND METHOD FOR ANIMAL IDENTIFICATION

(71) Applicant: SNOUTSCAN LLC, Southampton, NY (US)

(72) Inventor: Craig P. Mowry, Southampton, NY (US)

(73) Assignee: SNOUTSCAN LLC, Southampton, NY (US)

( * ) Notice: Subject to any disclaimer, the term of this patent is extended or adjusted under 35 U.S.C. 154(b) by 0 days.

(21) Appl. No.: 15/078,612

(22) Filed: Mar. 23, 2016

(65) Prior Publication Data

US 2016/0275106 A1 Sep. 22, 2016

Related U.S. Application Data

(63) Continuation of application No. 14/216,758, filed on Mar. 17, 2014, now Pat. No. 9,323,783, which is a continuation-in-part of application No. 13/546,946, filed on Jul. 11, 2012, now abandoned.

(60) Provisional application No. 61/878,853, filed on Sep. 17, 2013, provisional application No. 61/822,943, filed on May 14, 2013, provisional application No. 61/822,319, filed on May 11, 2013, provisional application No. 61/794,379, filed on Mar. 15, 2013, (Continued)

(51) Int. Cl.
*G06F 16/583* (2019.01)
*A01K 15/02* (2006.01)
*A01K 11/00* (2006.01)
*G06Q 50/00* (2012.01)

(52) U.S. Cl.
CPC .......... *G06F 16/583* (2019.01); *A01K 11/006* (2013.01); *A01K 15/021* (2013.01); *G06Q 50/01* (2013.01)

(58) Field of Classification Search
CPC .............. G06F 19/3418; G06F 16/951; G06F 16/9535; G06F 16/583; G06K 9/00067; G06K 9/22; G06Q 30/0214
See application file for complete search history.

(56) References Cited

U.S. PATENT DOCUMENTS 6,845,382 B2  1/2005  Meadows
8,798,593 B2  8/2014  Haney
(Continued)

*Primary Examiner* — Mariela Reyes
*Assistant Examiner* — Courtney Harmon
(74) *Attorney, Agent, or Firm* — Leason Ellis LLP

(57) ABSTRACT

Disclosed is a system and method for identifying an organism. At least one database includes electronic organism profile information representing at least one respective physical characteristic associated with a plurality of respective organisms, at least one respective corresponding attribute of the respective organisms, and an identity of at least one of the plurality of organisms, as well as owner information representing at least one person respectively associated with at least one of the organisms. Profile information that includes information representing physical characteristic(s) associated with the first organism associated with a first organism is received. In accordance with at least some electronic organism profile information and at least some of the first electronic profile information, an identity is identified. Thereafter, the at least one processor transmits to the first user computing device, the identity of the at least one of the plurality of respective organisms associated with the first organism.

21 Claims, 11 Drawing Sheets

Related U.S. Application Data provisional application No. 61/509,911, filed on Jul. 20, 2011, provisional application No. 61/506,505, filed on Jul. 11, 2011.

(56) References Cited

U.S. PATENT DOCUMENTS

| | | | |
|---|---|---|---|
| 2001/0013034 A1* | 8/2001 | Yamauchi | G06F 16/95 |
| 2002/0178079 A1* | 11/2002 | Russell | G06Q 10/10 |
| | | | 705/26.7 |
| 2003/0204417 A1* | 10/2003 | Mize | G06Q 30/02 |
| | | | 705/2 |
| 2004/0153477 A1* | 8/2004 | Meadows | A01K 11/00 |
| 2004/0230607 A1* | 11/2004 | Pawlick | A22B 1/00 |
| 2006/0201447 A1* | 9/2006 | Meadows | A01K 29/00 |
| | | | 119/720 |
| 2008/0036610 A1* | 2/2008 | Hokuf | A01K 15/021 |
| | | | 340/573.3 |
| 2009/0022401 A1 | 1/2009 | Huang | |
| 2009/0187583 A1 | 7/2009 | Pape et al. | |
| 2009/0245603 A1 | 10/2009 | Koruga et al. | |
| 2010/0248681 A1* | 9/2010 | Phills | H04L 67/04 |
| | | | 455/404.2 |
| 2011/0061605 A1 | 3/2011 | Nardi et al. | |
| 2013/0142398 A1* | 6/2013 | Polimeno | G06K 9/00926 |
| | | | 382/110 |

* cited by examiner

SYSTEM AND METHOD FOR ANIMAL IDENTIFICATION

CROSS-REFERENCE TO RELATED APPLICATIONS

This application is a continuation of Ser. No. 14/216,758, filed Mar. 17, 2014, which is based on and claims priority to U.S. Provisional Patent Application Ser. No. 61/794,379, filed on Mar. 15, 2013, and further claims priority to U.S. Provisional Patent Application Ser. No. 61/822,319, filed May 11, 2013, U.S. Provisional Patent Application Ser. No. 61/822,943, filed May 14, 2013, U.S. Provisional Patent Application Ser. No. 61/878,853, filed Sep. 17, 2013, and further is a continuation-in-part of U.S. Non-Provisional Patent Application Ser. No. 13/546,946, filed Jul. 11, 2012, which claims priority to U.S. Provisional Patent Application Ser. No. 61/506,505, filed Jul. 11, 2011, and U.S. Provisional Patent Application Ser. No. 61/509,911, filed on Jul. 20, 2011, the entire contents of all of which are incorporated by reference as if set forth herein in their respective entireties.

FIELD OF THE INVENTION

The present application relates, generally, to networking and, more particularly, to a networked system and method for identifying animals and communicating with people accordingly.

BACKGROUND OF THE INVENTION

Various ways of identifying animals, such as nose prints, have been printed to paper with ink to allow for subsequent identification for various purposes. The physical ink prints of such features may be scanned for inclusion in a database.

In addition, radio frequency identification ("RFID") technology may be used for identifying animals. For example, small RFID chips are implanted in animals and may be scanned by a reader to identify the animal. RFID is a costly method requiring implanted devices and trained specialists for the implantation and dedicated scanning equipment. Cumbersome data inputting needs are also required, from pet owner forms.

SUMMARY

Disclosed is a system and method for identifying an organism. In one or more implementations, at least one processor is configured to access at least one database that includes electronic organism profile information representing at least one respective physical characteristic associated with a plurality of respective organisms, at least one respective corresponding attribute of the respective organisms, and an identity of at least one of the plurality of organisms, as well as owner information representing at least one person respectively associated with at least one of the organisms. First electronic profile information associated with a first organism is received from a first user computing device, wherein the first electronic profile information includes information representing at least one physical characteristic associated with the first organism. The at least one processor determines, in accordance with at least some of the electronic organism profile information stored in the at least one database and at least some of the first electronic profile information, an identity of at least one of the plurality of respective organisms associated with the first organism. Thereafter, the at least one processor transmits to the first user computing device, the identity of the at least one of the plurality of respective organisms associated with the first organism.

Other features and advantages of the present application will become apparent from the following description of the invention that refers to the accompanying drawings

BRIEF DESCRIPTION OF DRAWINGS/FIGURES

Figure 11:
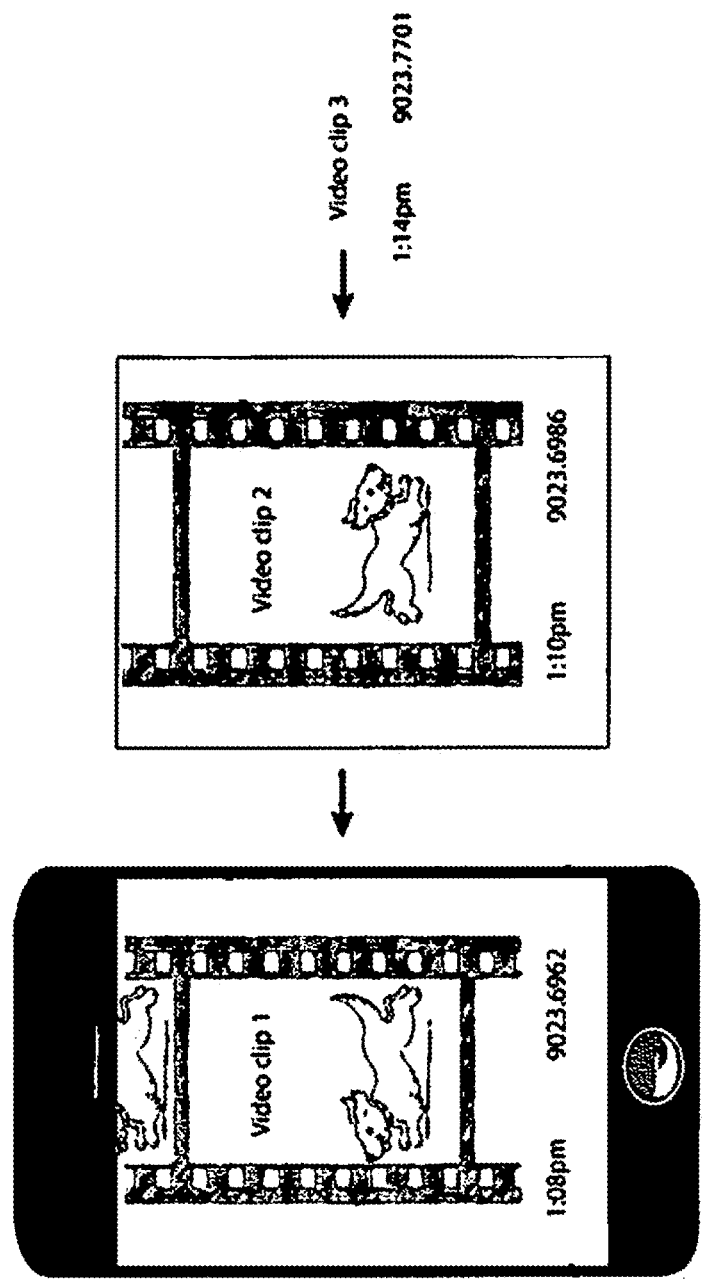

FIG. 11 demonstrates the dog owner's PDA device; and

Figure 12:
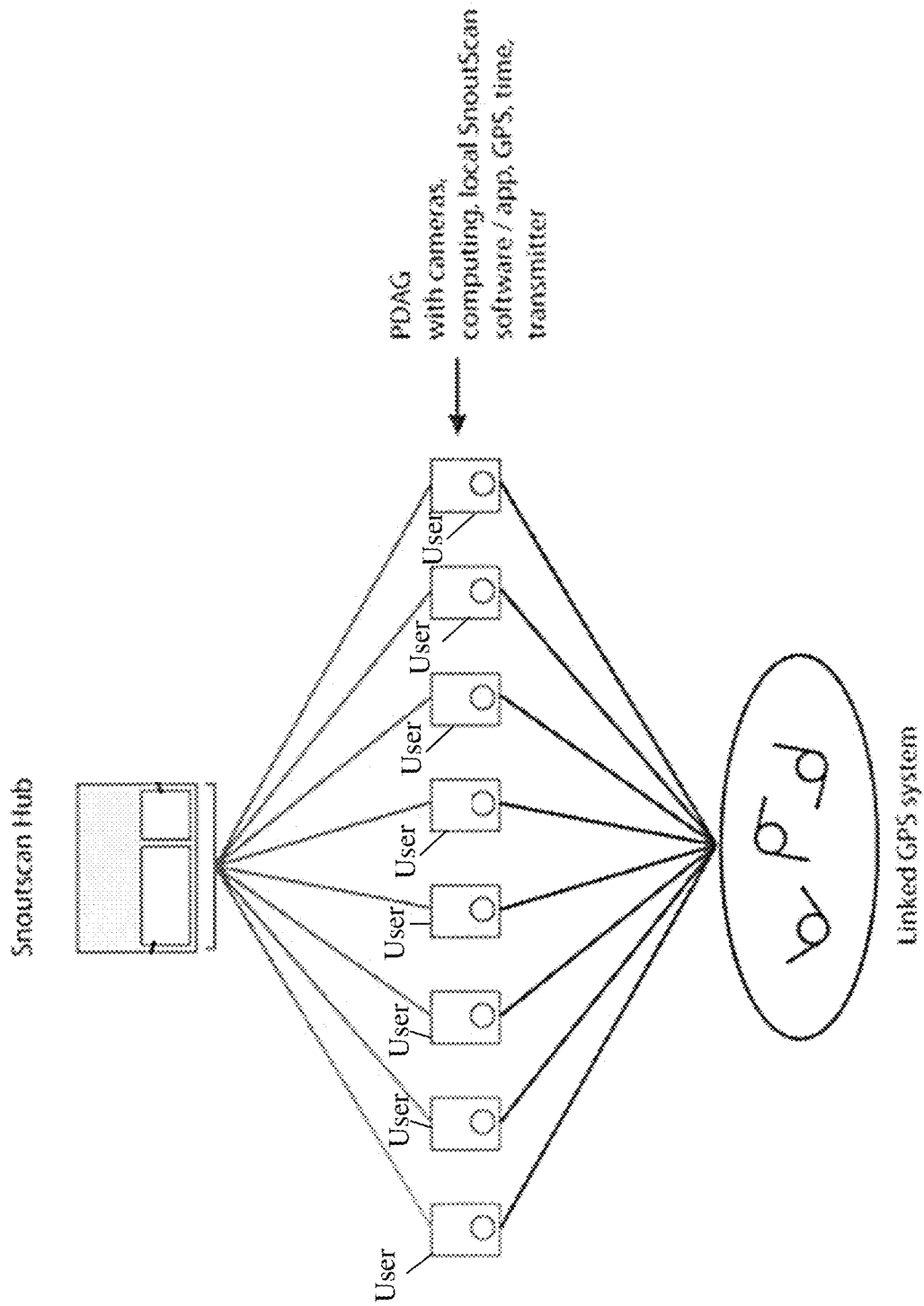

FIG. 12 illustrates fixed and mobile components of the present application.

DETAILED DESCRIPTION

In accordance with one or more embodiments of the present application, disclosed herein is a computer operable system, method and application for identifying (at least) animals, by way of an animal associated social network and at least animal characteristic(s), including biometric characteristics.

Included in one or more embodiments can be a primary computing module(s) for managing data provided by external computing modules, including but not limited to those within and/or linked to PDA devices, such as multi-function cell phone devices. One or more networks can be involved in linking such device(s) with the primary computing module(s).

PDA scanning devices now exist. Fingerprints can be used by the ANDROID system for providing scanned information to identify the user and to unlock unit functions, as a security feature. The scanning in this example, can be accomplished as a tandem use/function of the display portion of the phone/PDA. Through image capture operability, data can be generating in response to variations in scanned or otherwise sampled features related to an object placed in contact with the PDA screen and/or placed within a designated acceptable distance from a selected sensor(s) linked and/or embodied within the PDA device. Any such image capture and digitizing component array of a PDA device may be configured to glean and created data from selected discernable physical aspects of a pet.

One or more embodiments of the present application relates to a scanning feature of a PDA device having the linked application of scanning a print associated with an animal, such as its nose print, or other physical characteristics. Familiarly, nose prints of animals have been printed to paper with ink to allow for subsequent identification for various purposes. Herein these nose prints, not unlike human fingerprints, can provide an amount of scan-able information to provide a data file of information for conveying from a PDA device, through a network(s) to a hub computing module(s) and linked database(s).

Unlike existing technology for creating physical ink prints of such features and scanning them by hand, for inclusion in a database, herein the wireless device (PDA for example) can include one or more sampling components, such as a scanning functionality and/or image capture chip (or comparable component) for generating digital data from variations in a prescribed visual area, not limited to a portion of an animal's body such as the nose.

In one or more implementations, a service can be provided to internet users and/or PDA device users. This service can provide, for a fee or not, access to inputting information derived from an animal's unique physical characteristics, such as a nose print. Software provided within an application, such as a PDA device selectable application, can manage scanning and/or other related imaging of animal's unique physical characteristics. These may include the nose print and/or imaging via camera or other linked imaging functionality of the device(s) of the animal exterior. For example, a nose print and/or images of the animal, may provide identification markers and reference-able aspects for subsequent identification.

Such identification can involve a "narrowing down" of similar animal file results, provided as a list of animal profiles with photos for example, for final human and/or other additional modes (e.g. genetic) of identification of the exact animal in question. This, if the system was unable to definitively narrow the correlation down from one animal to one other animal.

The computer operable system in accordance with one or more embodiments of the present application can allow at least for information, such as physical aspects of an animal, to provide data that can be used to correlate information against information related to another animal in linked database(s), which may lead to an animal being matched to its own profile as previously input to the database, for example. This can aid in at least locating a lost animal.

By providing existing devices with the scanning and/or imaging functions and operability to extract animal image reference data usable by the system acceptable for correlation function(s), the current existing "RFID microchip" method of costly implanted devices requiring trained specialists for the implantation and dedicated scanning equipment, as well as cumbersome data inputting needs, is improved. Herein, in one or implementations, existing electronic wireless devices (PDAs for example) carried by millions may provide all necessary functions at the user/animal end of the method, which can allow existing animal aspects to provide the identification data via imaging, for example, that today a costly system provides by way of invasively implanting devices that emit information to specifically created devices compatible with such implanted chips.

In one implementation, scanning from an animal's nose is accomplished after downloading and opening a specific computer application, operable on selected PDA devices, such as an Android PDA-cell phone.

In one or more implementations, an animal's nose makes contact and fills a suitable amount of an area on the screen, such as a designated "circle" or "square," for example. Once an agreeable amount of information had been digitized relative to this scan, within the PDA or by way of an external computing function, (for example after transmission of image or image related data,) a confirmation can be provided that is visible and/or audible to the PDA user, preferably. (Apple's Iphone is one example of a wireless PDA device that features user operable applications that access uniquely configured network databases).

Optionally, additional information may form additional criteria of a profile related to the selected animal. This may include GPS gleaned and/or manually input location data, other information about the animal, including but not limited to name, physical, biological or behavioral attributes. Further, the associated owner(s) of the animal, or application user standing in for the owner(s,) can provide or otherwise be identified in association with at least some of the pet-related information, at least in part for later correlation between a lost animal and those who may be contacted in relation to that lost animal as a determined prior information provider(s).

In one or more implementations, hub computing can correlate program-determined points of correlation between a submitted animal scan and/or other information, and the database of information related to animals provided or accessible to that date. Location information, such as state, town, or even a prior confirmed GPS location determination, may narrow the field of files searched, or at least prioritize the library of profiles based on such seminal initial criteria, for example.

In lieu or in addition to the "nose scan," other visual information may serve as the basis of correlation and/or profile information in one or more implementations. This may include images derived from still and/or motion captures, by the PDA device or not, of the animal and/or of things associated with the animal, including but not limited to an owner(s) or other people, other animals, or even other visuals. Still or motion imaging of designated angles of the subject animal may provide data associated with markings and other characteristics sufficient to identify an animal in one or more embodiments. Further, a size reference can be imposed, to help the system automatically or otherwise correlate physical aspects of the animal relative to a standard size, for more exact size determinations of the animal and/or aspects of the animal that can be useful in identification. In one or more embodiments, the scanning feature may also serve as an identification tool on other body areas of an animal, other than the nose, or in addition to that aspect.

In one or more embodiments of the present application, audio information, such as a bark for example, may provide further identification cues, as vocal qualities can be quite specific to animals. Further, information for a profile may be input by users, all or in part, by "speaking" in relation to the image capture(s) to allow for an audio and/or transcribed (audio recognition based) profile result. This, in part, to make the quick inputting of animal information easy and effortless for a user, to increase willingness to download and use an affordable, or free, application based on the present invention. The goal being to get animals into the system to help protect as many as possible, that otherwise cannot be easily associated with proper owners if lost, for example.

In one or more implementations, the ability to capture, confirm, and/or request additional information can be provided, including but not limited to additional imaging required of an animal to properly catalog and/or correlate that animal's information acceptably. This can be accomplished, for example, by way of at least two linked computing devices. For example, a wirelessly network connected PDA device and a hub computer(s) coupled with a database(s) that can include compatible pet information for correlation by specific system programming designed to determine similarities between parts, all or in combinations of profile/animal-related information.

In marketing, the ability to provide such an application affordably, and/or initially at no charge, can lead to millions of animal's data being provided to a database(s) by owners wanting to at least protect their animals, should they get lost or stolen. Further, the opportunity to provide this product in tandem, or association, with other products and/or services, may be significant. Beyond the service of helping to unite many animals with owners not currently able to be reunited, or located, the revenue potential of even upgrading a pet's profile for a fee if lost, may be enormous.

In at least this implementation, upgraded profiles may increase the likelihood of correlation with lost animals that are scanned at animal shelters, rescue facilities, hospitals or others with access to the application. This, as the comparison of found animals with an initial group of "upgraded profiles, " representing at least lost animals who a related user has indicated to hug computing is lost, provides a narrower group of comparison speeding and correlation.

Thus, in at least one embodiment, one or only a few animals may need to be selected when the system provides a search result of correlated profiles/animals. Indeed, the upgraded group correlations may be provided first, in priority, before the other correlated animal results, if any. This, as this group is likely to include more lost animals than the other. Thus, the upgrading feature for lost animals can be area of great revenue potential as a free application may have a meaningful fee, to increase likelihood of locating the pet, such as $49.95, for example. Such fees are not easy to charge up front for services provide as PDA applications, for example.

This can be a critical and useful system distinction. In one or more implementations, the system functionality can include not only imaging and profile information to distinguish a subject, making it more likely to correlate with other system accessible data toward discreet and useful associations; it can also include the ability for member/user affected distinctions, subsequent to an initial scan and profiling, rendering the correlation process more effective. For example, by altering the "status" of the profile, a subject such as an animal, is moved and/or copied into a separate database store or category, representing a filtered or "premium" group, such as "missing member animals".

This subset of the overall database of accessible subjects' data, can provide a smaller data pool to reference, or reference as a priority, toward more likely correlation between a reference subject, such as a "found animal," and the correlation data pool, of "missing animals". Once location and/or other additional narrowing data aspects are also factored, the likelihood of a direct match between even just "nose scan" data can be increased, or at the least, the number of "similar matching animals" to a nose scan can be reduced to a manageable number of profiles and/or photos, to allow a person who has found an animal to establish if there is an animal in the database in that area who matches. In one or more implementations, a final round of reviewing data or at least photos provided of the subject (animal) may need to occur toward a final selection of likely animal match and access to communications with the associated member/human, directly or via other system interactive options provided. For example, this can be as simple as clicking an icon "I think I found your animal" to which the system provides an alert to that associated person (such as a human member who submitted an animal profile). In that instance, in at least one embodiment, an owner who indeed has lost an animal can respond to the system, if not directly to the animal finder, if that option is provided. Optionally, more direct and immediate direct chat and/or electronic communications between network members, associated with subjects such as animals, may be provided.

Thus, if not at the time of enrolling in the service, at the time of using the service to help locate a lost member-animal, significant revenue can be generated for the service overall in one or more embodiments. Filtered "groups" or subsets, based on animal aspects, criteria and/or circumstances, may be created to provide useful groups of animals and their associated humans.

The service in accordance with at least one embodiment of the present application may be easily purchased as a gift for others, unlike the cumbersome, expensive and invasive "pet chip system" that is implanted physically. Further, in at least one implementation, a single enrollment may entitle a user to scan more than one animal, allowing for other family and/or friends' animals to be enrolled in their account. Indeed, alerting a neighbor that their animal has been located is a great gift to be able to potentially provide. The ease of virtually everyone having access to the key component of the system, a PDA device with imaging capability, makes this system accessible, affordable and potentially very effective, at least, reuniting many animals with owners.

In accordance with one or more embodiments of the present application, mobile functionality of enrolling within an application network, which creates at least profile related database stored data related to an animal and an associated human/member is included. The need for physical printing and scanning of separate method components of necessity, in other methods (such as paper and ink,) can be eliminated.

Further, the network can be unique to the application and/or linked with existing networks, such as FACEBOOK and other familiar user based profile networks. Further, PDA functionality coupled with the present method can provide the new tandem operability of GPS based and/or manually input data being associated with the time of scan/capture of an animal's nose or related image captures. These location based profile data points, such as a location, can provide cataloguing bases options, including but not limited to location based "narrowing" and/or prioritizing of the field of correlation between scanned animals in the database(s) allowing for more manageable system operability, given the potential of similar nose scans within the system.

Further, in at least one configuration, a nose print is scanned through physical contact of the animal with the PDA or a PDA component, such as a protective clear screen over the PDA imaging component(s) to allow for contact that does not dirty or otherwise damage the PDA device. In at least one embodiment, direct contact with the PDA device is an option.

Further, in one or more implementations, the providing of at least one additional image, beyond a nose scan "image," of a given subject animal, can provide for another means of human and/or system based data correlation. For example, an animal-based social networking system and/or application in accordance with at least one implementation, can have PROFILES of animals. These can include manually input and/or automatically captured profile data, such as location data, time and date, etc.

Further profile data can include this additional image(s) which can provide visual reference to distinguishable aspects of the animal, such as a side and/or front view revealing unique markings and other recognizable aspects, whether by a human and/or by a computer operated data correlating program(s).

Such additional image(s) of an animal, or other subject, can provide additional material for the social-network style "profile" of the subject as well. Further, a system of size correlation may be provided, by manual input or special sizing programming that may company captured visual aspects of the subject with another object and/or other size related capture(s) for comparative approximation of animal size aspects and even potentially weight and other useful aspects in identification.

The present system, in one or more implementations, therefore provides a useful new approach to at least correlating subjects, live or otherwise, such as animals by providing profiles including imaging information, which can be correlated to help find "matches" between one profile and a similar profile(s) within or accessible to database(s) and/or system computer operability. Indeed any subject objects, living or otherwise, with at least a characteristic distinct from a comparable characteristic of at least one other subject, including an inanimate object, may be at least in part electronically associated by the at least one embodiment of the present system/method.

Though the present method and/or system may be used to correlate many subject types, the present preferred configuration relates to animals and, in some configurations, pets as an exemplary example of operability. Thus, at least one purposeful image capture, such as a scan or sampling of an animal (or portion thereof) can provide at least one computer manageable data point for correlating existing animal data in the database(s), which can be cataloged as profiles including at least some other data and including at least contact info associated with a person(s) linked by the system with an animal. In one or more implementations, such a person can be a profiled member, or profiled person associated with an animal member, of this animal social network operability: A social network because there are animals, represented by humans, provided with interactive capability directly and/or via system filtering, to at least transmit information that is conveyed, all or as altered by computing operability, to other human(s) represented within the network in association with at least one animal.

Further, the association of others in the network who are human, need not be limited to a direct association with an animal. Social networking and targeting operability of people, around the topic of animals for example, is provided in one or more embodiments of the present application with the core being an animal-featuring or referencing social network (or social networking aspect or application).

At least one configuration of the present application includes a plurality of imaging options with the PDA device aspect. For example, a camera and a scanning aspect, which may or may not be a tandem component and operability of at least a touch screen component/functionality. The capture of a potentially unique trait of a subject, such as a subject animal nose visual, may be accomplished with one or more of the imaging aspects of the PDA device. For example, in at least one embodiment, a photograph can be accomplished with the PDA not in literal contact with the subject. In one or more embodiments, the subject/object, such as an animal nose, can make contact with a component(s) of the PDA device, such as a scanning aspect provided in tandem with the touch screen portion of such a device and/or on the reverse side of that touch screen surface. Such a reverse side scanning component(s) can allow, for example, for a human fingerprint to be scanned to unlock a phone based on unique imaged aspects of a user's fingerprint. Further, such a scanning aspect may allow for a business card in another configuration, to be scanned by providing the card to the PDA device in some way that may or may not make contact with the PDA device imaging aspect(s).

In total, the PDA device aspect of the system/method in accordance with one or more implementations of the present application preferably can include imaging operability into at least a portion of the touch-screen component(s) and side of the PDA device, to most efficiently allow the device to make contact and scan an animal's nose, for example. One benefit of this additional operability to the touch screen aspect may be that the scanned nose can be visible following an effective scan as an actual image on the touch screen in at least approximately the place that that actual nose was placed for scanning. This provides an "immediate gratification" visual reward to the user, who is building a profile involving at least that nose-print (or other) subject related information.

Figure 1:
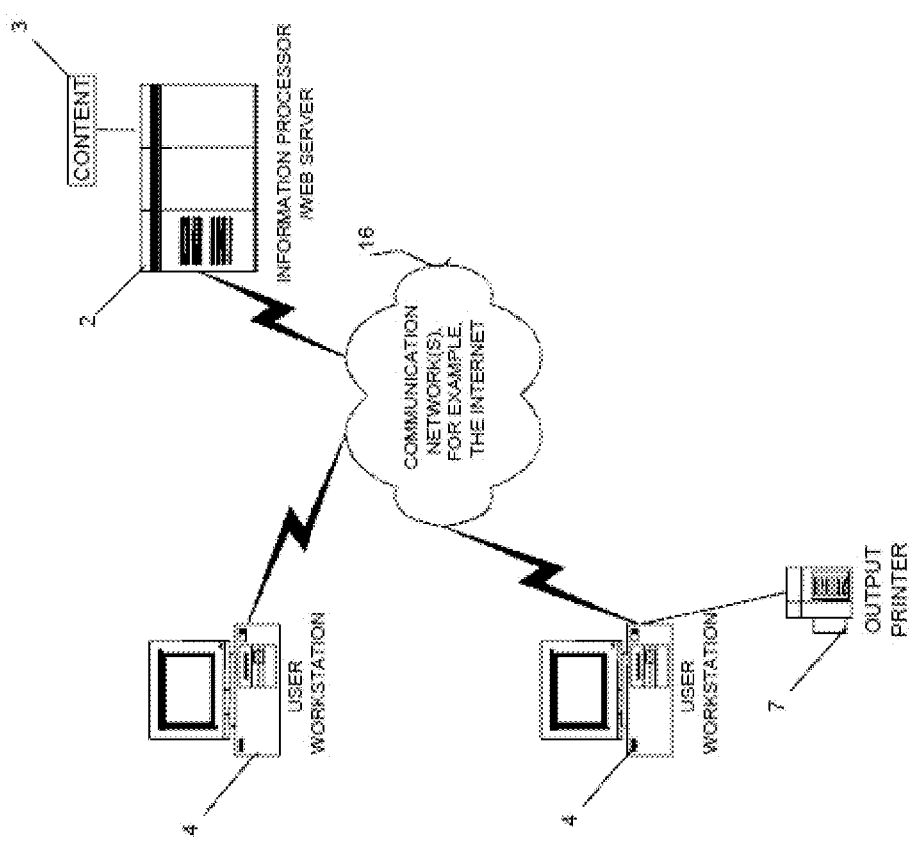
FIG. 1 shows an example hardware arrangement for viewing, reviewing and outputting content over a communication network in accordance with an embodiment.

Referring now to the reference figures, in which like reference numerals refer to like elements, FIG. 1 shows an example hardware arrangement for viewing, reviewing and outputting content over a communication network, such as the Internet. As shown in FIG. 1, an information processor 2, optionally functioning as an internet web server, provides electronic content 3 to a user workstation 4 that communicates with information processor 2 via communication network 16. Content 3 includes, for example, text, graphics, pictorial, audio and video material. The user workstation 4 employs software that enables a communication session to be established between the user workstation 4 and information processor 2. Information processor 2 employs software enabling a communication session, for example an HTTP session, to be established between the user workstation 4 and the information processor 2. Also as shown in FIG. 1, a printer 7 is in an example embodiment controlled by user workstation 4 to provide printed output of content 3.

Figure 2:
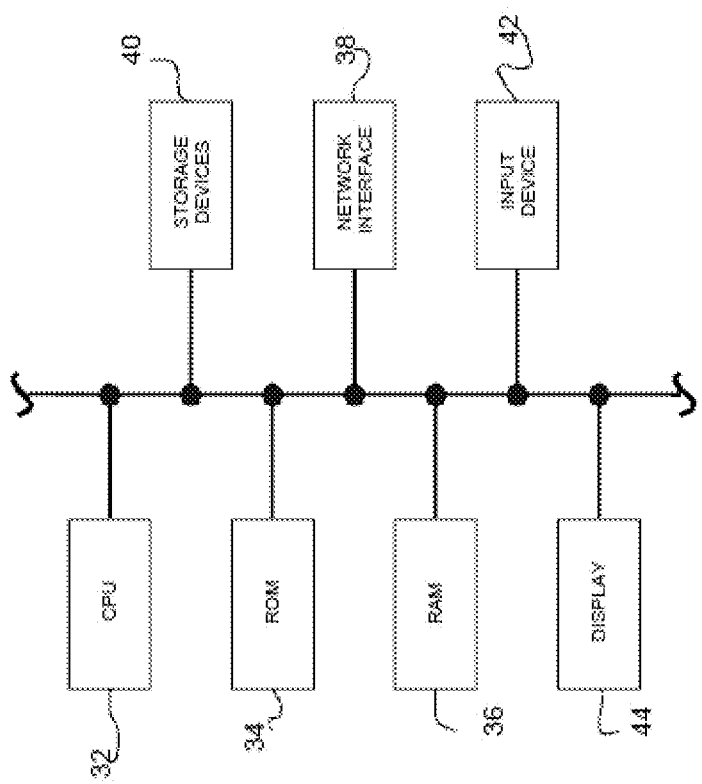
FIG. 2 is a block diagram that illustrates functional elements of information processor and/or a user workstation in accordance with an embodiment.

FIG. 2 illustrates the functional elements of information processor 2 and/or user workstation 4, and include one or more central processing units (CPU) 32 used to execute software code and control the operation of information processor 2 and/or user workstation 4, read-only memory (ROM) 34, random access memory (RAM) 36, one or more network interfaces 38 to transmit and receive data to and from other computing devices across a communication network, storage 40 such as a hard disk drive, floppy disk drive, tape drive, CD ROM or DVD for storing program code, databases and application data, one or more input devices 42 such as a keyboard, mouse, track ball, microphone and the like, and a display 44.

The various components of information processor 2 and/or user workstation 4 need not be physically contained within the same chassis or even located in a single location. For example, storage device 40 may be located at a site which is remote from the remaining elements of production user workstation 4, and may even be connected to CPU 32 across communication network 16 via network interface 38. In an example embodiment, information processor 2 includes a memory equipped with sufficient storage to provide the necessary databases, forums, and other community services as well as acting as a web server for communicating hypertext markup language (HTML), Java applets, Active-X control programs or the like to information processor 2. Information processor 2 is arranged with components, for example, those shown in FIG. 2, suitable for the expected operating environment of information processor 2. The CPU(s) 32, network interface(s) 38 and memory and storage 40 are selected to ensure that capacities are arranged to accommodate expected demand.

The nature of the present invention is such that one skilled in the art of writing computer executable code (i.e., software) can implement the described functions using one or more of a combination of popular computer programming languages and developing environments including, but not limited to C, C++, Visual Basic, JAVA, HTML, XML, ACTIVE SERVER PAGES, FLASH, JAVA server pages, servlets, and a plurality web site development applications.

It is contemplated herein that any suitable operating system can be used on information processor 2 and user workstation 4, for example, DOS, WINDOWS 3.X, WINDOWS 95, WINDOWS 98, WINDOWS 2000, WINDOWS CE, WINDOWS NT, WINDOWS XP, WINDOWS VISTA, WINDOWS 2000, WINDOWS XP, WINDOWS 7, WINDOWS 8, MAC OS, LINUX, IOS, ANDROID and any suitable PDA or palm computer operating system.

As used herein, the term, "module," refers, generally, to one or more discrete components that contribute to the effectiveness of the systems and methods described herein. Modules can include software elements, including but not limited to functions, algorithms, classes and the like. Modules also include hardware elements, substantially as described below. Modules can operate independently or, alternatively, depend upon one or more other modules in order to function.

As used herein, references to displaying data on information processor 2 and user workstation 4 regard the process of communicating data across communication network 16 and processing the data such that the data is viewed on a display 44, for example, by using a web browser and the like. As is known with web browsing software, the display 44 on user workstation 4 presents sites such that a user can proceed from site to site within the system by selecting a desired link.

Therefore, each user's experience is based on the order with which he/she progresses through the display screens. Graphical screen controls are available in the display screens and modules to initiate data processes, and to provide convenient navigation between the display screens and modules. In other words, because the system is not completely hierarchical in its arrangement of display screens, users can proceed from area to area without the need to "backtrack" through a series of display screens. For that reason, and unless explicitly stated otherwise, the following discussion is not intended to represent any sequential operation steps, but rather to illustrate the components.

By providing existing devices with the scanning and/or imaging functions and operability to extract at least animal image reference data usable by the system acceptable for correlation function(s,) the current existing "RFID microchip" method is improved. RFID is a costly method requiring implanted devices and trained specialists for the implantation and dedicated scanning equipment. Cumbersome data inputting needs are also required, from pet owner forms. Herein, existing electronic wireless devices (PDAs for example) carried by millions may provide all necessary functions at the user/animal end of the method, allowing existing animal aspects to provide the identification data via imaging, for example, that today a costly system provides by way of invasively implanting devices that emit information only to specifically created devices compatible with such implanted chips. Further, animal profiles comprising a "pet interactive network" or "social network," may further be coupled with existing or new human social networks, relating pet profile data with human profile data.

Figure 3:
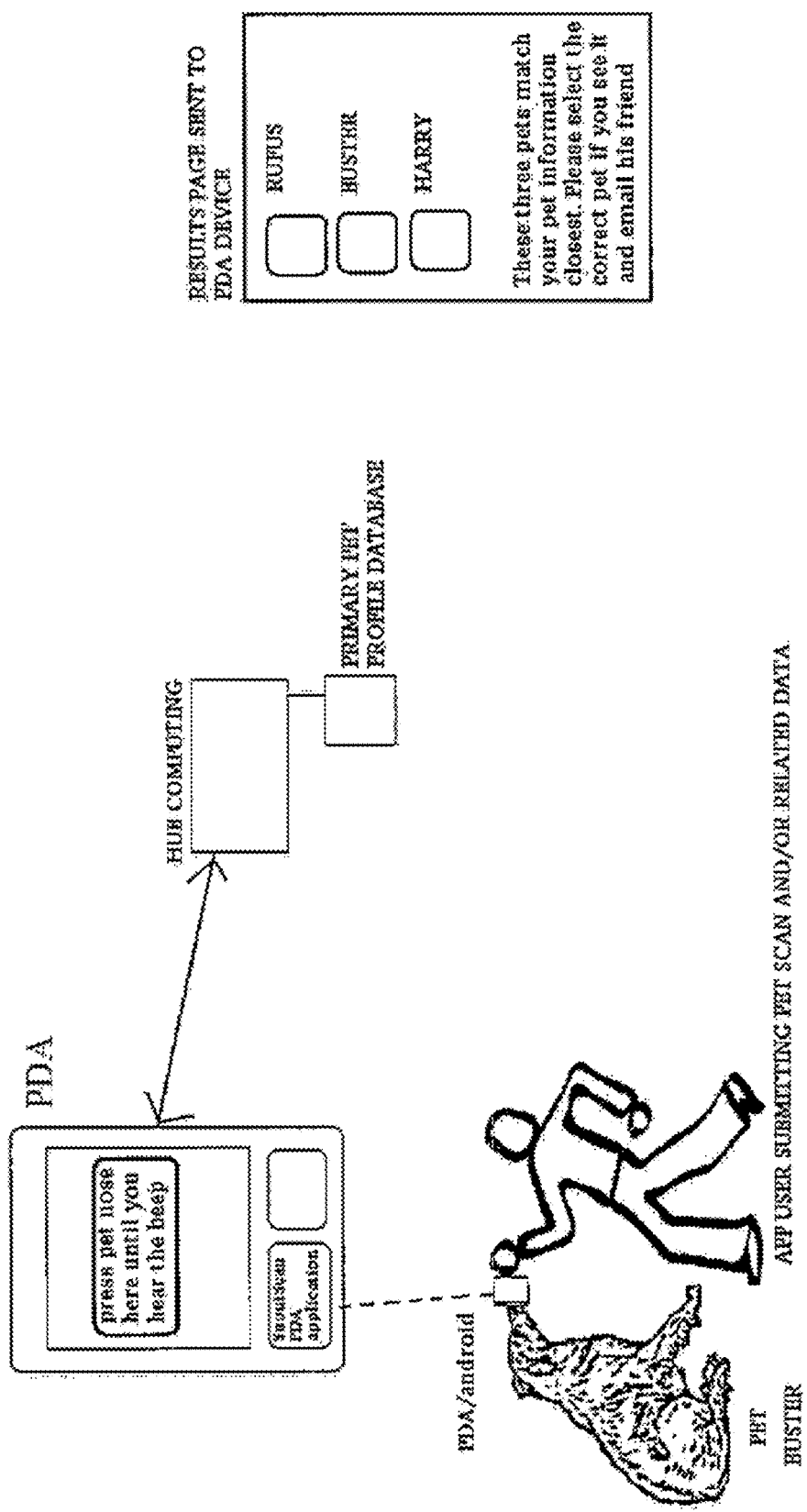
FIG. 3 illustrates a simple configuration of the present application.

FIG. 3 illustrates a simple configuration of the present system, demonstrating the PDA scanning and data base managing aspects of at least one configuration of the disclosed system, method and related components. The present application is further described below, including, in one or more implementations, identification cues and correlation areas for PDA device (or other computing device) capture and data comparison.

FIGS. 4-7 illustrate at least one implementation of the present application, where a relatively uncontrolled image capture, derived from one or more captures from a PDA device (for example) in still or video mode, or other capture mode, provides image information that may be analyzed and compared to other image information in at least one database in a myriad of ways.

Figure 4:
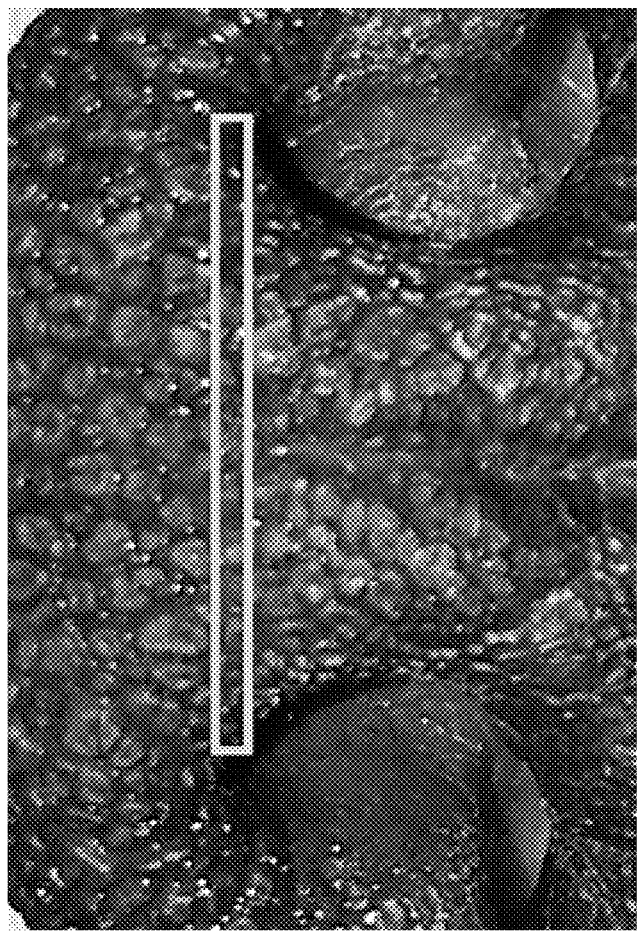
FIG. 4 illustrates an example image of an animal snout.

FIG. 4 illustrates an example image of an animal snout. As shown in FIG. 4, an identified and isolated region, (for example between nostril aspect(s) that most if not all dogs share) may provide comparable image aspects. For example, the excerpted region (the snout detail area) can be an "area" or even just a "line" wherein snout ridges and irregularities provide variations in light refraction. Even with varying light, at least some imaged aspects can provide comparable sequences of light and dark results, from left to right for example, as a dynamic of the snout skin's consistent effect on even variable light illuminating the snout.

Figure 5:
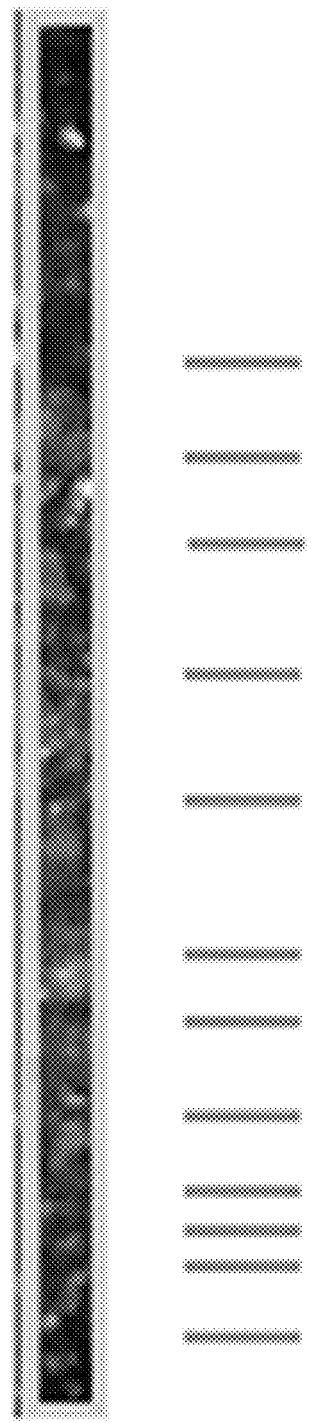
FIG. 5 shows an image of a portion of the snout in FIG. 4.

FIG. 5 shows an image of a portion of the snout in FIG. 4—the snout detail area—which illustrates distinguished depression areas, or variations indicating a depression and/or rise in the surface of the skin over this area. This image is similar to a geographic "relief map" showing mountain ranges versus flat desert regions.

Figure 6:
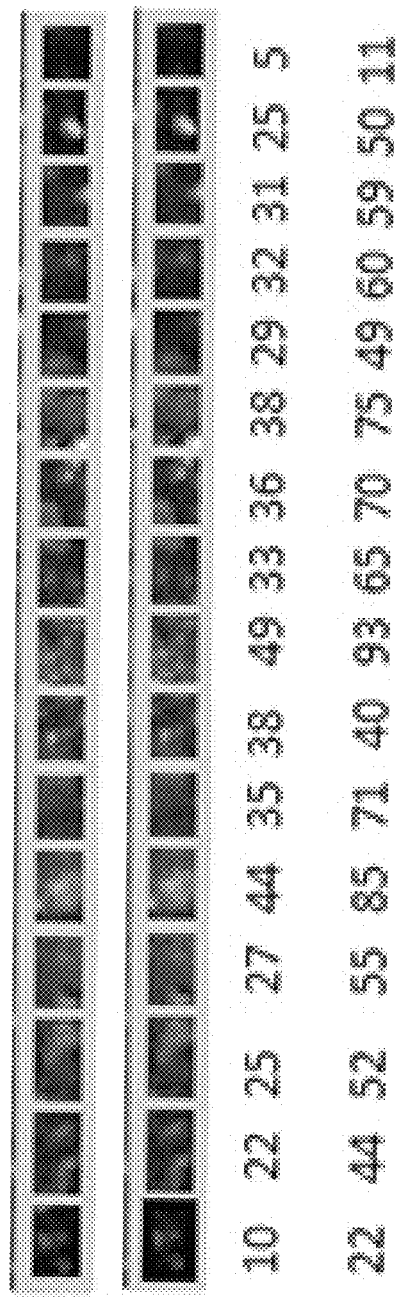
FIG. 6 shows segmented portions of the snout detail area.

FIG. 6 shows segmented portions of the snout detail area. The amount of white versus black (in this example) in the boxed area results from the same snout in different lighting. This example scenario presents one animal in the particular geographic region (half mile of flagged location) that has this same relative saturation (i.e., amount of black versus white) of at least some, if not all, of the segmented snout regions. Like a complete or partial bar code created from the imaged light/dark regions of the selected snout region.

Figure 7:
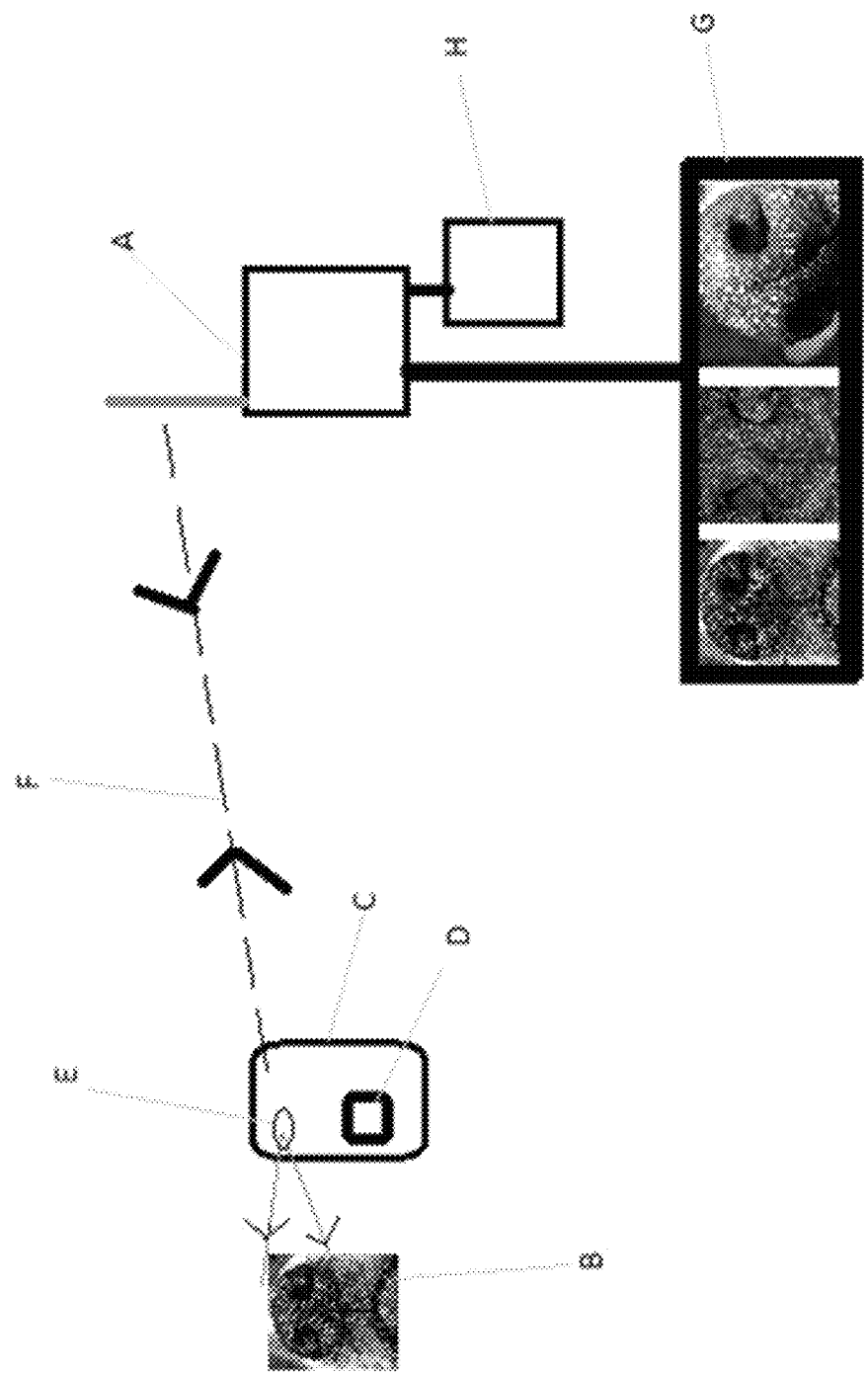
FIG. 7 illustrates an example of the animal identification and interactive networking system.

FIG. 7 illustrates an example of the animal identification and interactive networking system. As shown in FIG. 7, "A" represent a hub computing and system management, that is linked to a wireless receiver directly or indirectly; "B" represents a subject animal; "C" represents a user-operated PDA device; "D" represents an application icon, accessing services and membership/enrollment and image/data upload and transmission; "E" represents a PDA device camera and/or other biometric sampling component(s); "F" represents transmissions between the PDA device and the hub computing linked receiver; "G" represents biometric data, such as an image(s), maintained in a database related to animals; and "H" represents image or biometric-correlating software.

Below are examples of simplified image correlation approaches.
1) An area of the snout is distinguished, as a standard and/or variable feature recognition function of image analyzing programming of this computer managed system and method. Herein, the example region is distinguished in relation to dog nostrils, which are consistent image landmarks.
2) Like a relief map of a mountain range, regardless of the lighting source, in a wide range of scenarios even variable lighting will reveal/distinguish ridges, or depressions in the surface, relative to higher regions. Thus, like a bar code, markers of one or more size/width, may be ascribed to excerpted image portions, to show depressions and/or raised regions, creating a pattern or "Morse code" sequence of information that relates to at least some of the features of this excerpted, or distinguished, comparative region.

3) And/or, like a COLOR SHART or gradient comparative sequence, identified sub-regions of the comparative feature region, a very simplified numerical basis for distinguishing one animal (such as a dog) from another is demonstrated. As raised regions of the flesh, as with mountains in an image of the Andes, will cause an increase in lighter image area(s). As a result, the overall saturation in a an image utilizing only "black" information of the comparative feature region, can be segmented into a selectable sequence of "boxes" for example, each with a resulting "black saturation" number relating to black/white coverage (averaged for example). Thus, even in variable lighting situations a basis for correlation and identification of the same animal from different imaging conditions is provided, based on the relative ratios between at least some of the boxed regions within the comparative feature region.

4) Though not necessarily, imposing sampling/filtering tools, such as LOCATION based reduction of the overall relevant database represented animals, (such as those within a mile of a selected point or area, such as a dog owner's home,) combined with the discernible simple imaging distinctions demonstrated herein, will at least "order" a plurality of potentially relevant animals. At most, a single animal will be distinguished as the MOST relevant.

5) In a preferred configuration, such an ordering of animals would include a user friendly "likelihood" ratio. Meaning, if an animal is determined to be relevant to the imaging result/correlation herein, as the system deals with variable/imperfect captures and other limitations affecting perfect correlation conditions, a PERCENTAGE ratio and/or ranking of relevant results is preferred. For example, after imaging a dog's nose and providing it to a computer(s) associated with this correlation challenge, one of more animal(s) from the database may be provided as "relevant results" and a number and/or order representing a degree of relevance (or likelihood that this is the animal that correlates best) is provided.

6) More complex options include (for example) factoring more image feature areas; factoring more than just black information, such as selected color(s); factoring more than just camera imaged information, such as infrared or contact scanned information (including scenarios of the animal making contact with a scanning surface of a PDA or other device); factoring multi-dimensional information gathered through one or more lenses and/or sampling devices; factoring multiple sequential images, such as video captures, to derive a range of data relative to the same feature(s) to enrich the overall data file(s) used in correlation.... Among other options.

7) Herein, the invention relates in certain configurations to a database(s) that includes data that relates to the biometrics of animals, such as dogs. In one range of configuration(s), imaging is accomplished with a PDA device(s) such as smartphone(s). In one range of configuration(s) such PDA devices transmit at least data related to images or other sampling efforts related to animals such as dogs. In one range of configuration(s) data derived from dog(s) is transmitted by the PDA device that gathered the sampling data, such as image(s); In one range of configuration(s) a hub computer or computer array, manages the capture, transmission and/or correlation of information relate to animals by way of a PDA device managed application; In one range of configuration(s) contact scanning and/or other sampling devices are employed to gather information related to an animal(s). In one range of configuration(s), hub computing receives, correlates and provides results related to user provided animal information, which may include image(s) or other biometric sampling data unique to an animal, for example, and/or location information, user information, animal information provided by a user or otherwise accessed or inferred, time/date information, circumstantial information such as status of an animal as lost or not, among other options, are provided and computer managed.

An objective of the present invention is to provide an animal identification system that, at least, prioritizes relevant subjects in a database(s) in relation to animal related information provided by user(s).

The present application is further described below, including implementations including improvements related to animal identification, rescue and interactive network systems and methods.

One or more embodiments of the present application demonstrate systems that will allow PDA devices to interact with very regionalized location based transmissions for notifications and alerts, via NFC, BLE and related technologies.

Herein, identification information transmitting animal tag, including the solar powered configuration and other configurations, may provide a related improvement specific to lost dog alerts and further to reward alerts.

In one or more implementations, an animal wearing the SnoutScan tag(s) can transmit a low energy transmission, including via NFC, BLE and/or other means, that interact compatibly with both PDA device(s) and/or Wi-Fi and related regional signal transmission/receiving systems. Thus, in at least one implementation, a cell phone and/or home Wi-Fi system within a short range of a traveling animal, wearing a transmitting tag, can receive a specific alert and option to link into the network directly or at least allow the system to utilize their local network to contact the owner with location information. Here, in one or more embodiments, an altruistic permission to gain access to the network may be "allowed" even in password protected networks, and/or a REWARD may be provided to allow for the permission, allowing the notice recipient to enter or otherwise permit access to his, and or his network information to consummate a system managed transmission involving all or some of his hardware, near the lost animal. Further, a subsequent and or immediate reward, which may further beckon the recipient to join the network membership (or not) may involve network valued credit and or all or part of a cash reward. In this way, BLUETOOTH, Wi-Fi and the like may enable people in the proximity of an animal to be alerted as to a reward that is offered and/or to the status of the animal, including media that the animal tag may itself transmit (including data involving descriptive information about the animal, images, video and or access to same,) to help a local alert recipient to not only contact (or allow contact) of an owner, but to identify and animal himself. Geographic information may be further transmitted, allowing the recipient to aid in the locating and retrieval of a lost animal.

In one or more implementations, short term and specific REWARDS may be issued to users, even via their CELLULAR CARRIERS, or APP providers, (such as ITUNES,) by simply interacting advantageously and/or allowing for appropriation of their hardware for relaying information useful to the retrieval network, when an animal is within a detectable distance from them. Thus, for example, a blue tooth equipped cell phone carrier, may receive a notification on his device, via blue tooth visually or audibly, indicating that an animal is within 150 feet of him (for example) and there is $100 reward for safe retrieval and notification of the owner via the network, and or a $50 reward (for example) for simply allowing his cell phone to convey the tag information and his own phone location and related data to the network, to aid in the animal recovery effort, including in the proper alert of potentially more able, willing and situated animal lovers (and or network members) in the vicinity or otherwise distinguished by their traits, preferences or current status, location or other distinguishing factors manageable by system computing.

Indeed, the present application provides management by a special purpose computer of the network designed to identify, weigh and alert the most useful people and related device(s) with the most useful information, to increase the likelihood of a faster and more successful pet retrieval.

Thus, in at least one implementation, the pet's collar and/or pet itself may be equipped with hardware that at least transmits a low energy signal locally, that may automatically (if a network that is "open" is detected) and/or by special permission, rewarded of not, convey information to at least a local person(s) and/or an owner, who may gain additional information about his animal's location by virtue of the location of the network that detected/received his pet's transmission(s). Further, a plurality of such local detections can enable the system to not only map a single location.

Further, in one or more embodiments, a plurality of phones (and or PDA devices) that receive the signal(s) from an animal equipped with a transmitter, may contribute information that provides tandem correlation data for triangulating the current, updated and even the anticipated location of an animal based on the present invention. Thus, members or potential others may receive alerts of an animal that appears to be moving in their direction, and especially network members who are agreeable "dog finders" may receive early alerts, even based on their location and capacity (and or indicated willingness to help) as to an animal's location, progress, images taken (and or video sequences) and the like. In this way, a community member may retrieve an animal safely on behalf of an owner earlier than an owner just retrieving a pet that continues to travel. Time indeed is of the essence, especially with traffic and other dangers that kill many lost pets.

Technology surrounding the challenges of animal/pet/dog recovery is limited. Known are systems for correlating attributes of animals in a database for matching with other relevant database information.

One or more embodiments of the present application, in relation to such databases and in relation to interactive networks such as those linking cellular and/or PDA devices, provides an improvement that represents a computer(s) managed system for enhancing pet recovery options.

In relation to a pet-centric interactive network, including a social network of users in one configuration, one or more implementations include a system and/or method for documenting and confirming attributes of a lost pet's location(s). In one or more embodiments, the system can also enable the projection/anticipation of a pet's future location(s) and further enable enhanced notification options for mobile device and/or other system linked users for participating in a focused recovery effort in relation to a lost pet.

For example, a system in accordance with at least one embodiment of the present application can included linked components, such as At least one cellular or otherwise wireless network connectable PDA device(s), preferably a PDA device with at least image/video capture capability A GPS assembly, operable to interface with the PDA device(s) to determine a reference location(s) of the PDA device(s)

Software to enable information capture for compatible conveyance as notification information and/or media An animal that may be lost can be visually identified by a PDA device operator. This operator can access software, such as an application, for enabling operability under at least one implementation of the present application. This software is referred to as "SNOUTSCAN" for the following configuration(s) examples.

Through a fast access control, the software can enable the PDA (wireless) device to at least access GPS and/or time information. Through manual and/or automatic information gleaning, the PDA can be provided with system relevant information that can be provided as data to linked communication networking operability. Computing associated with the communication networking operability, or the "network," can correlate this data for selective conveyance to at least one other user(s) of the network operability associated with SNOUTSCAN.

In this example application, a user spotting a potentially lost animal opens the SNOUTSCAN "I see a dog" operability and the video camera and audio recording (mic) aspects of the PDA device (at least) are engaged; in this non-limiting example configuration. The experience of spotting the dog, a "collie" in this case, is memorialized by twenty seconds of video captured with an audio track recording the user's comments in relation to this dog spotting.

In this case, the user is talking about the animal's appearance, location and direction, and time of day. In this instance, more exacting positional and timing data associated with the spotting is automatically collected as programmed operability of the PDA device as engaged by the SNOUTSCAN software/programming.

Once the video has been collected with the audio and related data, and transmitted via the network, the dog spotting user (in this example) automatically receives the relevant LOST DOG ALERTS in that area, with the request, "are any of these the dog you just saw?" Six profiles are provided in this instance. Further, two are at the top of the list, as they system indicates, "your visual information indicates that these two animals may be similar to the dog you have seen based on your captured video".

To help in the process, a request to input breed, size and several other bits of relevant data are provided as prompts to the dog spotting (video providing) user. He opts to only indicate "collie" in the prompts before also enabling "I may be contacted directly by lost dog owners in this area," (opting for a 10 mile radius limitation to that direct contact option).

In this example configuration, three SNOUTSCAN users, one who is a DOG OWNING MEMBER and two who are limited "network users only," (i.e. non dog registering users,) have provided video of the same lost collie. In this example, when the owner realized his dog is not at home, he opens his SNOUTSCAN application on his own PDA device, accessing the "my dog FIDO is lost" button in the dog profile of his account. Immediately, at least several things occur in this example configuration, including:

a) All registered users of SNOUTSCAN who have allowed for LOST DOG NOTIFICATIONS to be sent, receive a text message in relation to this lost dog with at least access to the dog profile (and image(s)) provided. For others, when they access SNOUTSCAN a prompt indicating "six dogs have been lost within 5 miles of you, since your last log in. Click HERE to view these LOST DOG ALERTS" is provided as an option that can be bypassed for other use of the NETWORK functions.

b) The lost dog owner receives a MAP with three FLAGS dropped at GPS based locations, which directly (or through other option(s) provided to his PDA) provide access to AUDIO and VIDEO recordings provided by TWO of them. One was simply a data based entry, indicating "large-Collie" which by synergy with the other lost dog sighting entries, was determined by the system programming to be relevant to includes a 74% likely to be related to the other two sightings which are already determined to be 86% likely to be his dog FIDO based on visual and other data.

c) The system provides, in one configuration, a "play media by time" control, which allows all of the collected videos to be played to the potential DOG OWNER in the sequence in which they were captured. For JOHN, the owner of FIDO, he can now not only see this is FIDO to his eye, but the direction Fido is headed down the familiar road, MAIN STREET, is clear to him now in by the sequential play of the videos and the map demonstrating sighting points by time stamp, in an ordered presentation, "sighting 1, 2 and 3."

d) Further, a system operability projects anticipated direction and destination(s) of the animal based on time, showing he is likely to reach the corner of MAIN and OAK streets, by 1:08 pm, for example . . . . And Main and Maple by 1:12, with two alternate directions likely though less anticipated shown by colored "projected animal path" routes; not unlike the various hurricane path projections, which are delineated by their respective likelihoods/potential.

e) As John heads out toward MAIN and OAK, a text message from USER 1492B, (who chooses to remain anonymous,) is received indicating: "A user has found and is in possession of your pet. You may message this user by clicking HERE, and selecting TEXT OR VOICE for your message." This user has literally taken possession of and used SNOUTSCAN to image the animal's registered noseprint. Immediately, with 100% certainty, the FIDO "lost dog" profile appears on USER 1492B's PDA screen, as part of the SNOUTSCAN operability, with the button, "confirm this animal is in your possession" provided, which was indeed selected/engaged leading to the definitive notification to John in relation to Fido's recovery by a user.

f) John text messages the user that he "will be a Main and Oak in 3 minutes, and to please meet him there or indicate otherwise," to recover his animal. (Standard system programmed/universal messages could be engaged at this point as well, facilitating communication for standard, expected aspects of contact and recovery). This occurs without incident, allowing the user who has leashed FIDO to provide him to the rightful owner. On confirmation by John that the dog has been recovered, the four members who have provided information leading to the dog's recovery receive selected incentives, related to system services and/or advertiser (goods). In this case, John opted for a system option providing a $25 charge to activate an OWNER'S LOST DOG alert related to his pet FIDO. In another configuration option, a fee also pertains to the acknowledged recovery of FIDO, acknowledged by the owner, which at least compensates the system in relation to incentives provided to users who at least registered SIGHTINGS relevant to FIDO's recovery.

In this example, USER 1492B got the largest incentive, for literally gaining possession of the animal, removing the animal from danger. That user could have provided the animal to a SNOUTSCAN linked professional, such as an animal control facility, had he opted to not have direct contact with the pet owner. The lowest incentive receiver was the user who simply recorded information about a sighting, not providing any media, visual or audio to enhance his sighting report.

g) The electronic dog tag linked component

At least one embodiment of the present application has an additional aspect option enhancing reporting and recovery. In an alternate example described below, this electronic component's operability is demonstrated.

A dog tag provided to dog-registering users of SNOUTSCAN, can have several features. Any or all of them may be provided in various system configurations. The tag in this example includes visual information, including FIDO'S name and John's number, with a VISUAL print of Fido's actual SNOUT imprint, in high contrast, on the reverse side. As with Fido's actual snout, this high contrast image when scanned by a PDA device engaged in the SNOUTSCAN application and related operability, Fido's actual profile will be accessed directly or as a group of "most likely" profiles the snout print triggers. With visual scanning, the potential of similar profiles allows for imperfect scanning at initial profile creation or in imaging a lost dog's snout and or tag aspect, which is likely by unskilled users and, for instance, dogs that may be hard to keep still, etc.

In a preferred configuration, the SNOUTSCAN compatible animal tags have a POWER SOURCE and are electronic transmitters maintaining at least some transmittable data. For example, if Fido is registered animal A43392, that is the data the tag is configured to transmit over and over, or when triggered by external stimuli, to transmit. This code, receivable from SNOUTSCAN enabled device(s) within a prescribed radius of the tag, would at least provide access to network linked profiles and thus the exact animal profile matching the code. The margin for error or confusion as to whose animal is the subject can thus be reduced to virtually zero.

Further, solar collectability of light to convert to a small store of energy, usable by the tag to manage the low level data store and transmit operability needed for those within (at least) visual range, for example, to receive data related to lost animals in their vicinity . . . provides that dogs lost over an extended period of time are likely to have operationally transmitting tags.

Thus, on engaging the application on seeing an animal, a user can during and/or after imaging the animal he sees, (a time sensitive feature worth engaging without delay or room for confusion,) a profile(s) provided first, even before lost dog alerts, can indicate, this animal is within 300 yards of you, is this the animal you see? Then and/or subsequently, whether this animal has yet been updated by the OWNER to be a "lost dog" may be revealed or visible, along with any other animals that can be system presented as relevant to recovery of FIDO or similar and/or other animals in that area, at that time.

Figure 8:
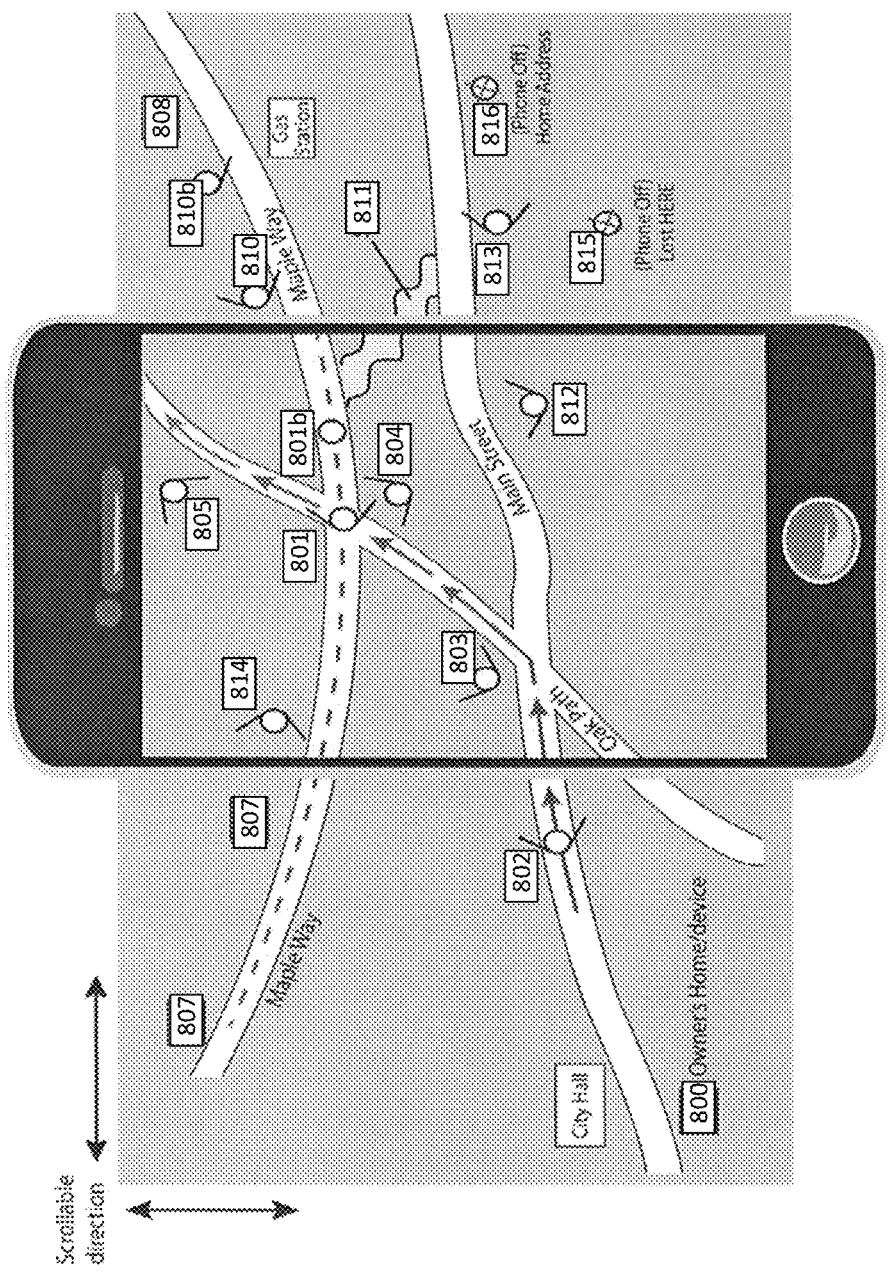
FIG. 8 represents a map received by a user in accordance with an implementation of the present application.

FIG. 8 represents a map received by John (on his PDA device, in this case an iPhone,) revealing that other users have already seen his dog within recent history, including two who have provided video/audio media in which the dog is visible clearly in a few frames of video (in this example).

The system has in fact used these clear frames of video in correlating aspects of animal profiles, by relevance aspects including LOCATION, LOST DOG STATUS, and VISUAL data related to breed, size and markings, for example.

FIG. 8 further demonstrates a determination, based on user's status, position, and their location(s) over time as well as the LOST PET'S BREED BEHAVIOR PROFILE to uniquely determine the most likely pathway(s) for the animal, leading to a prioritizing of connected users based on DETERMINATIONS made by system computing relative to their likelihood to encounter the animal and willingness to convey data and/or participate in active recovery efforts.

Further, alerts are sent herein to a cellphone of a user who is designated as an active recovery member (highest willingness to receive and act on notifications by member/user rankings,) though his phone is turned off. Indeed, when that phone is reactivated these alerts will be received and displayable. And, the alerts are also sent to that member's email and home phone accounts, agreeably by system computing correlation of that member's profile status and indications in these areas of venue/network participation and willingness.

Exemplary of functionality of at least one configuration of the present system and method illustrated in FIG. 8. Lost pet equipped with a transmitting unit position, 801, which may be configured as (or within) a pet ID tag housing, such as a collar tag, is moving away from his home on "Maple Way". He has moved over the one minute of time demonstrated in this figure, from position 801 to 801B. The original home location of the lost pet is 800.

Network "SnoutScan" members in possession of PDA devices 802, 803 and 804, and 805 are relatively stationery during the one minute of time, though moving member, 810, moves from his initial position to position 810B.

Iphone user 809 is not a network member. Though, the transmitter on lost dog, 801, is being received by his phone as a signal recognized as a "new network" that has a clever network name, revealing LOST DOG and a phone number, as a special information broadcasting aspect of the device, to make it more universal for reception by devices not configured to the network's optimal software. 811 represents a footpath between paved roads that an animal would be more likely to utilize than a person.

Members 812, 813, 814, 815 and 816 are members who have agreed to receive active alerts of lost pets in the network, including audio notification, namely a "bark" to let a user to know to check his screen which automatically opens image capture operability in case the animal is within sight. Such captured images being uploaded automatically (or otherwise) to the network after capture.

System computing has triangulated lost dog, 801's, position through at least passive members, (agreeing to convey data to the network without notification to them,) 802, 803, 804. Based on determinations made by system computing, including animal behavior aspects, mapped landmarks including roads and paths in the area, and member information including their membership status, location, motion/direction among other options, alerts are transmitted to targeted (as relevant) computing devices 812, 813, 815, 816. Smartphone 814 is not alerted, as this user is moving in the wrong direction and though a designated alert friendly member, he is not deemed relevant enough to include in the alerts, at this point.

PDA device at the last known location of member's PDA when turned on, and home member location receive alerts that will be retrievable when PDAs are turned back on and/or when email, voicemail or other linked notification options are checked.

Further operability may include a transmitting device that is also equipped with receiving capability, for PET/TAG 801. Receiving transmissions can further aid in causing alarms to sound or become visual, such as a lighted dog collar linked to such signal receptions, to allow interactive operability attached and/or otherwise maintained by PET 801 to trigger general audible, visual or receivable alarms/alerts that this PET is lost. Such functions can be triggered automatically when the animal is determined by triangulation or other linked components, (such as electronic "invisible fencing operability") to be beyond permissible bounds of the owner.

In this way, before an animal is even identified by other PDA devices, his own transmitter may alert cell towers and/or other receiving and/or triangulating compatible components to provide the system computing with information resulting in the triggering or alerts on, around or in relation to this lost pet via linked components of the system. These may include those local to the pet, local to members and/or otherwise compatible in some way with at least one hardware and/or software component of the present system and invention.

Figure 9:
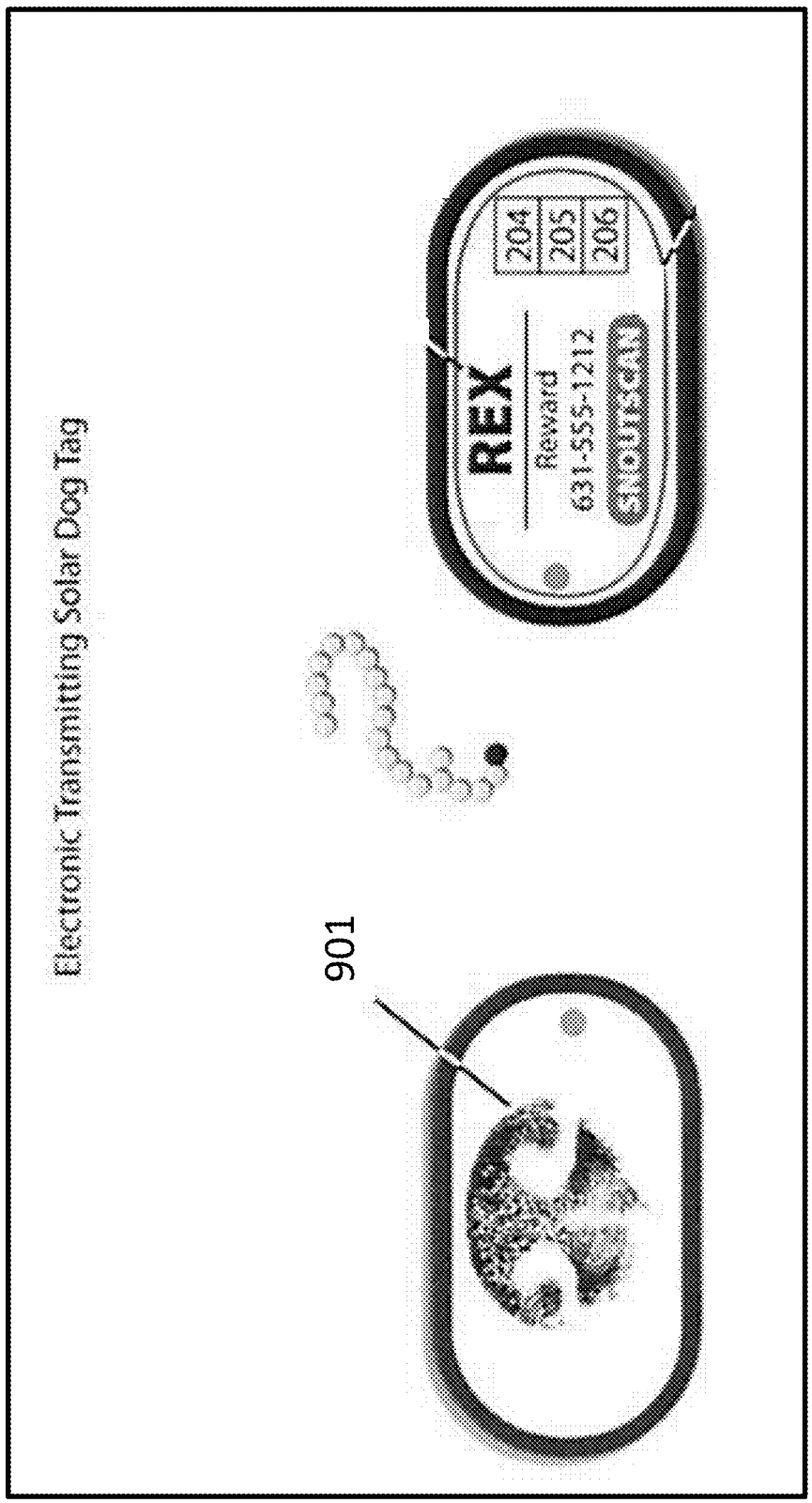
FIG. 9 illustrates an example electronic solar dog tag in accordance with an implementation of the present application.

FIG. 9 illustrates an example electronic solar SNOUTSCAN dog tag, with a facsimile 901 of the animal's unique nose print printed as black against white on one side, for example, with a solar collecting cell(s) powering a small energy store/battery. This can power a small transmitter that is programmed to provide at least a code as transmitted data that allows system operability to identify a single registered animal and user relative to the information related to the transmitted data. In another configuration, the tag transmits enough information locally to the linked PDA that SNOUTSCAN users and/or non-users, may receive enough data, even as a text message for example or emergency phone call, for example, that the animals identify may be received.

A solicitation provided by the animal tag transmission may even request the user to download the free application, SNOUTSCAN, to allow for this animal to be confirmed in case it is a missing pet. Indeed, like being requested to join a local WI-FI network, enough data may be provided that all such WIFI capable devices may at least receive a NETWORK request to join to at least interact with the animal that is within a PDA user's vicinity. Even visual, such as photo, information may be provided in such an instance.

If a user is or becomes linked to the SNOUTSCAN network, though direct or affiliated application access, the tag transmission(s) may lead to much more accessible and relevant information. For instance, a FACEBOOK or linked partner network can allow for even non animal registering users to receive lost dog notifications if they are within the vicinity of a tag bearing animal, simply as a non-member public service allowing their affiliated membership to engage WIFI functions to allow them to at least have the means to aid in an animal's recovery, should their device's WIFI or other typically engaged functions pick up a transmission, or receive a transmission that their affiliated membership determines (through ongoing, invisible operability) is likely a lost animal seeking its owner.

Figure 10:
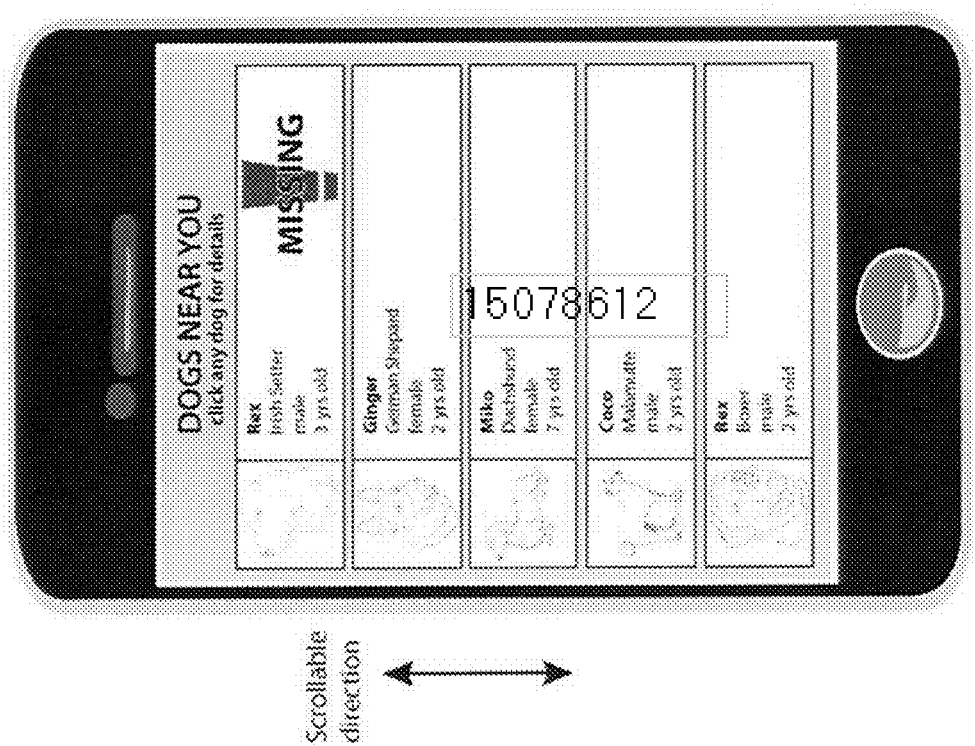
FIG. 10 illustrates an example screen that a user can encounter, such as user/PDA unit.

FIG. 10 illustrates an example screen that a SnoutScan user can encounter, such as user/PDA unit 802 (see FIG. 8) when activating his PDA device on seeing an animal who can be lost and/or in response to an alert that an animal is lost, is heading in the direction of the user, or other related alerts enabled by the system software.

FIG. 11 demonstrates the dog owner's PDA device, following his review of the GPS based map showing apparent sightings of his dog, Fido, wherein the device selectively provides a time based (ordered) sequence of media, in this case two video clips, thought photos would have also been sequenced and provided had they been taken by those sighting Fido with their application engaged for imaging. Preferably, imaging will involve multi image capture video, as obtaining any useful images of a moving animal from a moving camera device suggests that multiple images have the best chance of providing at least one clear one allowing for better discerning of the animal and the environs, or the like.

FIG. 12 illustrates (some of) the fixed and mobile components of the system and method, in one configuration. This array demonstrates a minimally operational group of components in relation to the sighting scenario to follow, which corresponds to the figures.

In relation to the figures, herein follows a USE CASE example related to user, who has come to realize his dog, FIDO is not in the back yard, having escaped his fending. Herein, other system users have provided information already, alerting the owner of the potentiality of FIDO being the dog they are seeing and in some cases acquiring (and/or providing) image, GPS, time and/or other data, related to.

In one or more configurations involving a version of the "transmitting tag," a plurality of users who have at least become associated with a network and database related to animal recovery, users can become relay stations of pet identification transmissions.

In this example, the transmitting dog tag is a device with a solar component for gathering light and converting it to energy stored by a rechargeable energy storage component, or battery. A transmitting aspect can be configured to at least transmit a bit of data, such as an alphanumeric code, that is potentially known to a linked database.

In at least one implementation, the tag can be configured to transmit information that any smartphone can be able to read, such as a message that can be recognized as a "Wi-Fi network name" or other commonly displayable PDA (such as smartphone) information. For example, the transmitting tag can be seen as a new WIFI network called "lost dog JoJo 212-555-1212".

In a preferred configuration, the dog tag would at least transmit, intermittently or continuously, a signal that an activated application running on a smartphone could receive as easily as a cell phone call's transmission. Further, members of a "pet safety net" who enroll in a service, can be prompted in this configuration to "allow your PDA device to receive and convey any animal ID's that are receivable to the network, and your position, in case a lost dog is near you," and can further request a permission to "alert you that you are in the vicinity of a dog registered as lost, including a special audio alert such as a bark, to help you become aware that a lost pet may be near you and in need of help."

Further, in yet another configuration, these members of a pet safety net can be distinguished by PDA device owners who are agreeably linked to computing managing such a pet based network. They can be further distinguished by agreeably allowing programming local and/or accessible by their PDA device, to be engaged during all or nearly all times that the PDA device is turned on, or at least turned on with at least signal receiving functionality engaged. In this way, when any transmitting dog tag is within a receivable range of any network member who is configured to at least passively (by PDA device) receive and convey information associated with a transmitting dog tag, an owner who is seeking recovery of his pet may be informed of at least the location at which that PDA device encountered the signal of his pet's tag and at what time.

In one configuration of the invention, if the network member who is, or was, in range of that dog tag is not actively engaged in the recovery of the pet, then at least a "map" of pet motion by PDA devices who encounter that pet tag transmission may be constructed and modified, each time another compatible PDA device encounters the tag. Then, as a network service, the owner of the lost pet could be able access a map that not only reveals at least one location and time where his pet was in a definite vicinity, but by projecting the path of the pet based on a plurality of such mapped points of signal reception, hypothetical direction(s) and location(s) of the pet currently can be provided as a mapping functionality of the system and this invention.

Thus, not only cell phone towers, but potentially every PDA device within a range of a transmitting dog tag can provide information for system correlation as to current and/or projected location of that moving subject, or pet. Further, network members and/or PDA device users who have agreed to receive LOST PET ALERTS, can be prioritized based on a variety of factors. This could include, their current location relative to a lost pet and/or a moving pet's location (or anticipated location). It can also include their agreeing to be active LOST PET FINDERS, whether for incentives or not related to their participation in IDENTIFYING AND PROCURING AND/OR ALERTING RELATED TO LOST PET'S THEY FIND.

Thus, as a unique functionality of the present invention, transmissions for such a tag, or transmissions from an implanted or otherwise pet-attached device with transmission capability, AGREEING MEMBERS of a network or affiliated grouping of PDA devices users, (such as a smartphone user group distinguished by share software/functionality or other designation,) can be PRIORITIZED according to active or passive user designations. This includes the active designations that a user can ascribe or permit about himself, including ACTIVE AND AGREEABLE PET RECOVERING MEMBER who is willing to receive active alerts about lost pets he can help recover. Variable such as LOCATION, TIME, DIRECTION OF THE MEMBER'S OWN MOTION, among other aspects, selectively factored in relation to an of the "active designations" of that member, could impact HIS ORDER IN THE SEQUENCE OF ALERTED MEMBERS in the "pet safety net" network.

Thus, the five smartphone user/members within 500 yards can be alerted first of that LOST PET STATUS of an transmitting animal, as the network is also alerting the OWNER of these members being provided with UPDATE ALERTS. Such "flag pole" designations on a map can occur in relation to actual and/or hypothetical flagpole location(s) of the pet based on system software determinations. Indeed, a plurality of signal receptions by different PDA and/or receivers of any compatible type, can allow for triangulation of more exact animal location, by factoring the signal strengths received by at least two receivers at the same, or nearly the same time(s). As a pet travels, newly relevant users can be determined and notified and put in to action. As a user's smartphone encounter's a transmission, at least one other user(s)' phone may be thus alerted of the LOST DOG, based on time and proximity to the other phone, even if the receiving phone was a passive member who is only willing to have his phone silently enrolled in "receiving and transmitting updates" without alerting him of the passive conveyance his device may be engaged in providing.

Further, active designations would in another configuration include "I may be contacted" or "contact lost dog owner" which may directly, or through network links, put member(s) in direct voice and/or data contact (through transmissions wirelessly) with a LOST DOG OWNER (or lost dog registrant, such as a shelter or other system recognized entity for that animal).

Further, as an ACTIVE ALERT is received agreeably by a member, his smartphone would in one configuration immediately DISPLAY the profile and/or image of the LOST PET, for quick and easy visual identification of the actual pet if within sight. Further, in another configuration, camera(video) operability of the smartphone can be automatically engaged on receiving of a signal associated with a LOST PET, to allow a participating member to capture video of the animal at least, aiding in the ongoing visual and data record of an animal that may not be easy to stop or retrieve/restrain. Thus, immediate linking ability to such uploaded media may allow an owner to not only confirm his pet's identify visually, but to further gain information about the direction and area of the pet's known sightings.

Further, in another configuration, pet control and shelter authorities would be updated as to the occurrence of LOST PET alerts, registrations and recoveries, etc. In this way, owners who lose pets often and members who aid in pet recovery most, or by some criteria more effectively than others, can become specially designated members of the service and network membership. This may even include added incentives, provided by LOST PET OWNERS and/or the service generally, to encourage an active and effective community of members engaging in the successful retrieval and return of lost pets to owners as quickly as possible, to avoid ongoing dangers to pets associated with traffic, theft, other animals etc.

Further, a cellular transmitting technology provides for computer triangulation of cell phone receiving towers alone or in concert with at least one PDA device. This PDA device(s) then relays information to a tower(s). Thus, a service of the pet safety net operability herein includes in this configuration cellular or comparable signal receiving components that may at least identify information associating the transmission with LOST PET ALERT, a time, a location and information associated with the receiving device(s). This may be subsequently used in alerts, mapping, triangulating and prioritizing other system options for best use and result in recovering a pet safely, quickly and effectively.

Further, in yet another configuration herein, additional factors are weighted by system operability by linked computing, specific to animal behavior. Further, if the system were applied to other subjects, such as missing children equipped with transmitting devices, their unique behavioral patterns would selectively be included herein, to determine hypothetical direction, speed and pathways toward likely recovery and recovery location(s).

For example, animals are more likely to follow along roads, though less likely than a human to avoid woods or other natural pathways that are not created by humans. Thus, the system of alerts to safety net members of the network, can be altered even based on dynamics of breed behavior, species behavior factors programmed into system computing and/or external factors including Seasonal factors, road surfaces and other variables that could impact hypothetical subject (including an lost animal or a human,) likely pathway(s).

The present invention further relates in another configuration to the safety net of wireless linked users including animals who have profiles, with the profiles including biometric information. This biometric information may include data related to imaged and/or scanned body parts, be they inclusive of the entire animal and/or of a detail of the animal.

One key example of such a body part is a dog's nose, or snout. This including image-able regions that are unique to such an animal, allowing for a dermatoglyphic identification signature, based on the dynamics discerned of that snout, or body part, as converted into digital data that is able to be correlated against comparable managed data in a database. This, including data derived from the same and/or other animals.

A visual example of a networked series of PDA devices, in this case smartphones, some equipped with SNOUTSCAN system (network) software, provided initially as downloaded "apps" agreeably installed by the smartphone owners. Another user is a non-member, whose smartphone is receiving the "lost pet" dog tag transmission and seeing it as information comprehensible to his phone, in this was a "discovered network signal" called "I am lost dog FIDO 212-555-1212" which is appearing on the device, just as one can see "would you like to connect to ATT Wi-Fi network".

Although the present invention has been described in relation to particular embodiments thereof, many other variations and modifications and other uses will become apparent to those skilled in the art. It is preferred, therefore, that the present invention not be limited by the specific disclosure herein.

The invention claimed is:

1. A method for identifying an animal and engaging selected computing devices with associated notifications, the method comprising:

providing, by at least one processor, membership services for individuals, including services associated with locating and retrieving lost animals;

enrolling, by the at least one processor, a plurality of the individuals as animal-owning members of the membership services as a function of receiving, from the plurality of individuals, electronic profile information representing at least:

identifications of the respective animals, images of the respective animals, owners of the respective animals, computing devices of the plurality of individuals, and permission from the plurality of individuals to receive notifications regarding the respective animals;

distributing software having instructions that configure each of a first plurality of user computing devices to operate in a first mode ("passive mode") and having instructions that configure each of a second plurality of user computing devices to operate in a second mode ("active mode");

receiving, by the at least one processor from a first computing device configured by the software, first animal information representing an individual animal and first location information representing location of the first computing device, wherein:

if operating in the passive mode, the first user computing device displays no message associated with transmitting the first animal information and first location information to the at least one processor, if operating in the active mode, the first user computing device displays a message associated with transmitting the first animal information and first location information to the at least one processor;

determining, by the at least one processor using the received first animal information and at least some of the electronic profile information, an identification of the individual animal, a primary location of the individual animal, and contact information for a device associated with individual animal;

receiving, by the at least one processor from a second user computing device configured by the software, second animal information representing the individual animal and second location information representing a location of the second user computing device;

processing, by the at least one processor, the received first location information, the received second location information, and the primary location of the animal to project a pathway of the animal;

identifying, by the at least one processor as a function of the projected pathway of the animal, at least one third computing device configured by the software to operate in the active mode; and transmitting, by the at least one processor, to the at least one third user computing device, a message representing individual animal and an anticipated location of the animal based on at least the estimated pathway.

2. The method of claim 1, wherein the permission is at least associated with a potential frequency of a plurality of notifications over a prescribed period of time.

3. The method of claim 1, wherein prior to transmitting to the at least one processor, the first user computing device received at least some of the first animal information from a transmitter coupled to the individual animal.

4. The method of claim 1, wherein at least one of the members is an animal professional associated with a veterinarian practice, a shelter or an animal care organization.

5. The method of claim 1, further comprising:
managing information associated with a financial reward to a first member following an owner of the individual animal being reunited with the individual animal.

6. The method of claim 1, wherein an enrolled member transmits information associated with the individual animal to a non-member.

7. The method of claim 1, wherein the first computing device is further configured by the software to:
detect a signal from a respective transmitter coupled to the individual animal;
receive, from the respective wireless transmitter, at least a code associated with individual animal and the respective wireless transmitter; and
transmit, without human interaction, the transmitter information to the at least one processor, wherein the transmitter information is associated with or includes the code.

8. The method of claim 7, wherein the code is received via at least one of near field communications, cellular communications, and Wi-Fi communications.

9. The method of claim 7, wherein the code is received by the first computing device via at least one communications network and the transmitter information is received by the at least one processor via a second communications network.

10. The method of claim 7, wherein the wireless transmitter is configured with an energy harvesting module that is paired with a power storage module for providing energy for intermittent transmissions.

11. The method of claim 1, wherein the location information associated with the first computing device is associated with a respective cellular tower.

12. The method of claim 1, wherein the pathway is further determined as a function of time.

13. The method of claim 12, wherein the time is measured from a time associated with the first location information and a time associated with the second location information.

14. The method of claim 1, wherein the pathway is further determined as a function of a triangulation of location information from the first computing device and the second computing device at one or more points in time.

15. The method of claim 1, wherein the at least one processor receives, from at least the first computing device, updates that represent a plurality of locations; and further comprising:
determining, by the at least one processor, at least one other anticipated location of the animal.

16. The method of claim 1, wherein each of the first user computing device and second user computing device are further configured by the software to:
determine a signal strength from a transmitter coupled to the individual animal;
determine at least some location information specific to the individual animal; and
provide signal strength information representing the determined signal strength to the at least one processor, and further comprising:
determining, by the at least one processor based on the received signal strength information, a specific location relative of the individual animal.

17. The method of claim 1, wherein the primary location of the individual animal represents a location where the animal lives.

18. The method of claim 1, further comprising:
determining, by the at least one processor based on correlating the primary location in relation to the first location information and the second location information, and based on determined direction and speed of the individual animal based on at least some of the electronic profile information specific to the individual animal, at least one likely future location of the individual animal; and
transmitting, by the at least one processor to a user computing device associated with an owner of the individual animal, a message representing the at least one likely future location of the individual animal.

19. The method of claim 1, wherein the first computing device is a Wi-Fi networking device operating in a passive mode, and providing a password-protected Wi-Fi computer network that is not part of the membership,
wherein the first computing device automatically received at least some of the first animal information, respectively, from a transmitter coupled to the animal and sent the at least some first animal information to the at least one processor or at least one second processor without requiring the transmitter to provide credentials to join the password-protected Wi-Fi network.

20. The method of claim 1, wherein at least some of the permission in the electronic profile information enables the at least one processor to transmit notifications to at least one computing device operating in an active mode regarding animals.

21. A system for identifying an animal and engaging selected computing devices with associated notifications, the system comprising:
one or more non-transitory processor readable media;
at least one processor operatively coupled to the one or more non-transitory processor readable media;
wherein the one or more processor readable media have instructions for causing the following steps to be performed by the at least one processor:
providing, by at least one processor, membership services for individuals, including services associated with locating and retrieving lost animals;
enrolling, by the at least one processor, a plurality of the individuals as animal-owning members of the membership services as a function of receiving, from the plurality of individuals, electronic profile information representing at least: identifications of the respective animals, images of the respective animals, owners of the respective animals, computing devices of the plurality of individuals, and permission from the plurality of individuals to receive notifications regarding the respective animals;

distributing software having instructions that configure each of a first plurality of user computing devices to operate in a first mode ("passive mode") and having instructions that configure each of a second plurality of user computing devices to operate in a second mode ("active mode");

receiving, by the at least one processor from a first computing device configured by the software, first animal information representing an individual animal and first location information representing a location of the first computing device, wherein:

if operating in the passive mode, the first user computing device displays no message associated with transmitting the first animal information and first location information to the at least one processor, if operating in the active mode, the first user computing device displays a message associated with transmitting the first animal information and first location information to the at least one processor;

determining, by the at least one processor using the received first animal information and at least some the electronic profile information, an identification of the individual animal, a primary location of the individual animal, and contact information for a device associated the individual animal;

receiving, by the at least one processor from a second user computing device configured by the software, second animal information representing the individual animal and second location information representing a location of the second user computing device;

processing, by the at least one processor, the received first location information, the received second location information, and the primary location of the animal to project a pathway of the animal;

identifying, by the at least one processor as a function of the projected pathway of the animal, at least one third computing device configured by the software to operate in the active mode; and transmitting, by the at least one processor, to the at least one third user computing device, a message representing the one individual animal and an anticipated location of the animal based on at least the estimated pathway.

* * * * *